United States Patent Office 3,254,062
Patented May 31, 1966

3,254,062
PRODUCTION OF RUBBERY POLYMERS OF CONJUGATED DIENES
Lawrence E. Forman, Akron, Ohio, assignor to The Firestone Tire & Rubber Company, Akron, Ohio, a corporation of Ohio
No Drawing. Filed Apr. 14, 1961, Ser. No. 102,956
11 Claims. (Cl. 260—82.1)

This invention relates to rubbery polymers of conjugated diolefins, rubbery copolymers and interpolymers of conjugated diolefins, and rubbery copolymers and interpolymers of conjugated diolefins with minor proportions of hydrocarbon vinyl compounds. More particularly, the invention relates to the control of the molecular weight of such polymers formed with lithium-dependent polymerization catalysts.

It is known to produce stereospecific polymers of conjugated diolefins with lithium-dependent polymerization catalysts. Such polymers frequently are characterized by undesirably high molecular weights. Such high molecular weight polymers, particularly high cis-1,4 polyisoprene, are difficult to process on conventional rubber compounding machinery. The art has, therefore, endeavored to control the lithium-dependent catalyzed polymerization of conjugated diolefins to produce polymers of lower molecular weight which still retain the desired microstructure.

It is accordingly an object of this invention to provide stereospecific diolefin rubbers which can be readily processed on conventional rubber compounding machinery.

It is a more specific object of the invention to provide a method for the production of high cis-1,4 polyisoprene which can be readily processed on conventional rubber compounding machinery.

It is an additional object of the invention to provide a method for the control of the molecular weight of high 1,4 polybutadiene rubber produced by polymerization of butadiene-1,3 with an organolithium catalyst.

It is more specifically an object of the invention to provide a process for the polymerization of isoprene in the presence of an organolithium catalyst to produce a polyisoprene rubber characterized by a cis-1,4 content of at least about 85% and which is of substantially lower molecular weight than conventional lithium-catalyzed polyisoprene.

In accordance with this invention, rubbery polymers, copolymers and interpolymers containing at least 85% 1,4 structure are produced by polymerizing a monomer selected from the group consisting of isoprene, butadiene-1,3 and piperylene with an organolithium catalyst in the presence of a carbonyl compound, said carbonyl compound being present in an amount requisite to provide not more than about one mol of carbonyl oxygen per mol of catalyst employed, said polymerization being effected in the absence of oxygen other than that present in said carbonyl compound.

The carbonyl compounds contemplated by the invention include all of the various aliphatic and aromatic ketones, aldehydes or esters. Carbonyl compounds which contain not more than about 10 carbon atoms and particularly aliphatic ketones are preferred. Representative ketones which can be employed include acetone, methyl ethyl ketone, methyl propyl ketone, methyl isopropyl ketone, ethyl propyl ketone, dipropyl ketone, di-n-butyl ketone, methyl butyl ketone, acetophenone, ethyl phenyl ketone, isopropyl phenyl ketone, diphenyl ketone and the like. Representative aldehydes include acetaldehyde, propionaldehyde, butyraldehyde, hexaldehyde, octanoicaldehyde, crotonaldehyde, benzaldehyde, p-ethylbenzaldehyde, and the like compounds. Representative esters include methyl acetate, methyl propionate, propyl butyrate, methyl butyrate, ethyl acetate, ethyl propionate, ethyl butyrate, ethyl benzoate, phenyl acetate, phenyl propionate, and similar compounds.

The carbonyl compound utilized in accordance with the invention is incorporated into the polymerization reaction mixture in any suitable manner. The quantity of the carbonyl compound utilized must carefully be controlled to preclude adverse effect on the cis-1,4 content of the resulting isoprene polymer. More specifically the carbonyl compounds are used in an amount requisite to provide not more than about one mol of carbonyl oxygen per mol of catalyst employed. A preferred range is from 0.1 to 0.9 mol of carbonyl oxygen per mol of catalyst utilized.

The invention is generally applicable to the production of stereospecific rubbery polymers of controlled molecular weight by the bulk polymerization of isoprene, butadiene or piperylene in the presence of organolithium catalysts. Such catalysts and polymerization techniques are well understood and are described, inter alia, in British patent specification 813,198 and in the article entitled, "The Stereoregular Polymerization of Isoprene with Lithium and Organolithium Compounds," by Stearns and Forman, J. Poly. Sci. 51 381–397 (1959). In general, the organolithium catalysts are compounds of lithium in which the lithium exerts a sufficiently strong reducing action as to displace hydrogen from water. "Organolithium compounds," as used herein, include the various lithium hydrocarbons, i.e., hydrocarbons in which one or more hydrogen atoms have been replaced by lithium and adducts of lithium with polycyclic aromatic compounds.

The following relevant disclosure occurs in British patent specification 813,198, at lines 74–92, page 4:

"Moisture in the polymerization zone, since it tends to use up catalyst, should be kept at a minimum. Oxygen and other components of the atmosphere have been found to inhibit polymerization and consequently should as nearly as possible be kept out of the reaction zone. These gaseous materials are conveniently removed by bringing the polymerization charge to a boil and venting a portion (e.g., about 10%) of the charge from the polymerization vessel prior to sealing the same and effecting polymerization. Particularly to be avoided is the presence of oxygenated and nitrogenous organic compounds such as ethers, esters, amines and the like, which are usually considered essential components of alkali metal catalyst systems: these compounds should be rigorously excluded from the reaction mixtures of this invention."

Suitable lithium hydrocarbons are for instance alkyllithium compounds such as methyllithium, ethyllithium, butyllithium, amyllithium, hexyllithium, 2-ethylhexyllithium and n-hexadecyllithium. In addition to the saturated aliphatic lithium compounds, unsaturated compounds are also suitable such as allyllithium, methallyllithium and the like. Aryl-, alkaryl- and aralkyllithium compounds such as phenyllithium, the several tolyl- and xylyl-lithiums, alpha- and beta-naphthyl lithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylenedilithium compounds such as methylenedilithium, ethylenedilithium, trimethylenedilithium, pentamethylenedilithium, hexamethylenedilithium, decamethylenedilithium, octadecamethylenedilithium and 1,2-dilithiumpropane. Other suitable polylithium hydrocarbons are polylithium-aryl, -aralkyl and -alkaryl compounds such as 1,4-dilithiumbenzene, 1,5-dilithiumnaphthalene, 1,2-dilithium-1,3-diphenylpropane, and the like. Tri- and higher lithium hydrocarbons are also suitable, such as 1,3,5-trilithiumpentane or 1,3,5-trilithiumbenzene. Other compounds include the various lithium hydrocarbon amides. Likewise, there may be employed the lithium-polynuclear aromatic hydrocarbon adducts produced by simply reacting lithium metal with naphthalene, anthracene, biphenyl, and the like polynuclear aromatic hydrocarbons. The hydrocarbon acquires a negative charge without losing any of its hydrogens, and serves as the anion (the lithium losing an electron to serve as the cation) of the salt. It should be understood that the various lithium compounds can be used either alone, or in any combination as mixtures with each other, as the catalyst of this invention.

In general, the larger the amount of catalyst used, the more rapidly the polymerization will proceed and the lower the molecular weight of the product. Ordinarily, there should be employed an amount of the catalyst such as to contain from about 0.00002 to about 0.1 gram of lithium element for each 100 grams of monomer in the polymerization mixture. Preferably the smallest suitable amount of catalyst will be used, which ordinarily will not contain more than about 0.05 gram of lithium element per 100 grams of monomer.

The monomers employed in the invention are preferably quite pure and dry, and are substantially free of any impurity, such as an alpha-acetylene, which reacts more rapidly with the catalyst than does a conjugated diolefin. Pure butadiene can be copolymerized with isoprene in accordance with the invention in any proportion, but preferably in the range of 1% to 50% of the total monomers. A hydrocarbon vinyl monomer can be copolymerized or interpolymerized with a major proportion of either isoprene, butadiene, piperylene, or mixtures of isoprene, butadiene and piperylene. Typical vinyl monomers contemplated for use in the invention are styrene, alpha-methylstyrene and vinyl toluene.

The temperature of polymerization can be varied over a wide range, for example, from −50° C. to 150° C. The polymerization pressure can also be widely varied, but normally will range between one atmosphere and several atmospheres, no especial advantage being realized at high pressures. When operating at higher polymerization temperatures it is appropriate to maintain the pressure high enough to insure that substantially all monomer and solvent are in the liquid phase.

The polyisoprene synthetic rubbers produced by the invention are gel-free linear polymers of high molecular weight and usually contain about 90% cis-1,4 structure. In the copolymers and interpolymers produced in accordance with the invention the isoprene portions are typically about 90% arranged in the cis structure. Butadiene copolymerizes to provide about 90% of its units in mixed cis- and trans-1,4 structure, of which about 20 to 60% is cis. The microstructures of polyisoprenes and of isoprene copolymers produced by the method of the invention are determined by the infra-red technique described in an article by J. L. Binder and H. C. Ransaw, Analytical Chemistry, volume 29, pages 503–508 (1957). The microstructures of the polybutadienes and of butadiene portions of copolymers and interpolymers containing same are determined in conformity with the technique described in J. L. Binder, Analytical Chemistry, volume 26, page 1877 (1954).

The polymerization reaction is preferably effected in the presence of an inert solvent. Appropriate solvents include saturated aliphatic hydrocarbons such as petroleum ether, butane, pentane, heptane, octane, gasoline, cyclohexane or mixtures thereof. Any convenient proportions of solvents can be employed. Preferably solvent is utilized in a quantity such that a cement of the desired rubbery polymer is obtained at the end of the polymerization. For example, one part of solvent to one part of total monomer represents a concentrated solution, whereas 100 parts of solvent per one part of total monomer represents a dilute solution. It is appropriate to utilize the solvent in an amount sufficient to provide a cement containing from about five to about thirty parts by weight of polymer.

*Example I*

A clear glass beverage bottle was charged with 100 grams of pure isoprene and 400 grams of mixed pentanes as a solvent. Acetone (0.079 gram) which had been dried over anhydrous calcium sulfate and distilled in a nitrogen atmosphere was added to the charge. Butyllithium catalyst (providing 0.0098 gram of active lithium) was introduced into the bottle by hypodermic syringe. The bottle was then sealed by a crown cap lined with aluminum foil and maintained at the polymerization temperature of 25° C. for 16 hours. The bottle was cut open and contents removed. The resulting polymer, having an inherent viscosity of 1.9, was subjected to infra-red analysis, which revealed that the product possessed the following microstructure:

|         | Percent |
|---------|---------|
| Cis-1,4 | 90.5    |
| Trans-1,4 | 2.0   |
| 1,2     | 0       |
| 3,4     | 7.5     |

Comparable results are obtained when the various alternative organolithium catalysts are substituted for butyllithium, and when the alternative carbonyl compounds such as propionaldehyde, benzaldehyde, ethyl acetate, acetophenone, and the like, are substituted for acetone.

*Example II*

Two clear glass beverage bottles hereinafter designated as bottles "A" and "B" were charged with 410 grams of a twelve percent by weight solution of butadiene in n-hexane. To bottle "A" was added a butyllithium catalyst in an amount requisite to provide about 0.017 gram of lithium per 100 grams of butadiene. To bottle "B" was added 0.02 ml. of crotonaldehyde plus the same butyllithium catalyst added to bottle "A." The catalyst was added to bottle "B" in an amount requisite to react on a mol for mol basis with the crotonaldehyde and to provide in addition about 0.017 gram of lithium per 100 grams of butadiene. The bottles were maintained at 50° C. overnight for a total time of about 15 hours, when the polymerizations were complete.

Infra-red analysis of the polymer products indicated the following microstructure:

|           | Polymers of Bottle "A", percent | Polymers of Bottle "B", percent |
|-----------|-------------------------------|-------------------------------|
| Cis-1,4   | 31.4                          | 30.5                          |
| Trans-1,4 | 60.1                          | 60.9                          |
| 1,2       | 8.4                           | 8.6                           |

The inherent viscosity of the polymer of bottle "A" was 1.21, whereas the inherent viscosity of the polymer of bottle "B" was 0.83. Both polymers were gel free.

The foregoing examples demonstrated the production by the method of the invention of polyisoprene and polybutadiene of excellent microstructure but of substantially lower molecular weight than conventional organolithium catalyst polymerized conjugated dienes.

What is claimed is:

1. The method of producing a stereospecific rubbery polymer containing at least 85% 1,4-structure which comprises polymerizing a monomer selected from the group consisting of isoprene, butadiene and piperylene by means of a catalyst consisting essentially of an organolithium compound which reacts with water to liberate hydrogen and in the presence of a carbonyl compound containing not more than about 10 carbon atoms and selected from the group consisting of aliphatic and aromatic ketones, aldehydes and esters, said carbonyl compound being present in an amount requisite to provide from about 0.1 to about 0.9 mol of carbonyl oxygen per mol of catalyst employed, said polymerization being effected in the absence of oxygen other than that present in said carbonyl compound, and the amount of said catalyst being sufficient to provide from 0.00002 to 0.05 gram of active lithium element per 100 grams of said monomer.

2. The method of claim 1 in which said catalyst is a hydrocarbon lithium compound.

3. The method of claim 2 in which said catalyst is an alkyllithium compound.

4. The method of claim 2 in which said catalyst is an aryllithium compound.

5. The method of claim 1 in which said carbonyl compound is a ketone.

6. The method of claim 1 in which said carbonyl compound is an aldehyde.

7. The method of producing a stereospecific rubbery polymer containing at least 85% 1,4-structure which comprises polymerizing isoprene with an alkyl lithium catalyst in the presence of a carbonyl compound containing not more than about 10 carbon atoms and selected from the group consisting of aliphatic and aromatic ketones, aldehydes and esters, said carbonyl compound being present in an amount requisite to provide from about 0.1 to about 0.9 mol of carbonyl oxygen per mol of catalyst employed, said polymerization being effected in the absence of oxygen other than that present in said carbonyl compound, and the amount of said catalyst being sufficient to provide from 0.00002 to 0.05 gram of active lithium element per 100 grams of said monomer.

8. The method of claim 7 wherein said carbonyl compound is acetone.

9. The method of claim 7 wherein said isoprene is copolymerized with butadiene.

10. The method of claim 7 wherein said isoprene is copolymerized with styrene.

11. The method of producing a stereospecific rubbery polymer containing at least 85% 1,4-structure which comprises polymerizing butadiene-1,3 with an alkyllithium catalyst in the presence of a carbonyl compound containing not more than about 10 carbon atoms and selected from the group consisting of aliphatic and aromatic ketones, aldehydes and esters, said carbonyl compound being present in an amount requisite to provide from about 0.1 to about 0.9 mol of carbonyl oxygen per mol of catalyst employed, said polymerization being effected in the absence of oxygen other than that present in said carbonyl compound, and the amount of said catalyst being sufficient to provide from 0.00002 to 0.5 gram of active lithium element per 100 grams of said monomer.

References Cited by the Examiner

UNITED STATES PATENTS

| | | | |
|---|---|---|---|
| 1,953,468 | 4/1934 | Ebert | 260—94.2 |
| 2,881,156 | 4/1959 | Pilar et al. | 260—94.9 |
| 2,913,444 | 11/1959 | Diem et al. | 260—94.2 |
| 2,975,160 | 3/1961 | Zelinski | 260—83.7 |

JOSEPH L. SCHOFER, *Primary Examiner.*

MORRIS LIEBMAN, LEON J. BERCOVITZ,
*Examiners.*

M. A. GANNON, C. R. REAP, *Assistant Examiners.*